United States Patent
Kloth et al.

(10) Patent No.: US 7,324,441 B1
(45) Date of Patent: Jan. 29, 2008

(54) METHODS AND APPARATUS FOR ALLEVIATING DEADLOCK IN A FIBRE CHANNEL NETWORK

(75) Inventors: Raymond J. Kloth, Saratoga, CA (US); Maurilio Cometto, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 932 days.

(21) Appl. No.: 10/620,301

(22) Filed: Jul. 14, 2003

(51) Int. Cl.
*H04J 1/16* (2006.01)
*H04J 3/14* (2006.01)

(52) U.S. Cl. .................... 370/229; 370/236
(58) Field of Classification Search ........ 370/229–236, 370/389, 401, 412, 428, 429
See application file for complete search history.

(56) References Cited

U.S. PATENT DOCUMENTS

| | | | |
|---|---|---|---|
| 6,570,853 B1* | 5/2003 | Johnson et al. | 370/236 |
| 7,085,846 B2* | 8/2006 | Jenne et al. | 709/232 |
| 2003/0115355 A1* | 6/2003 | Cometto et al. | 709/234 |
| 2004/0076116 A1* | 4/2004 | Hefty et al. | 370/230 |
| 2004/0153566 A1* | 8/2004 | Lalsangi et al. | 709/234 |
| 2005/0141424 A1* | 6/2005 | Lim et al. | 370/235 |
| 2005/0220025 A1* | 10/2005 | Noguchi | 370/235 |
| 2006/0039366 A1* | 2/2006 | Ghosh et al. | 370/360 |
| 2006/0072587 A1* | 4/2006 | Ramaswamy et al. | 370/396 |

OTHER PUBLICATIONS

Cherkasova et al.; *Simulation Study of Fibre Channel Fabrics with Particular Emphasis on 64-Node Clusters*; Hewlett-Packard Laboratories, 1501 Page Mill Road, Palo Alto, CA 94303; pp. 1-34.
Cherkasova et al.; *Fibre Channel Fabrics: Evaluation and Design*; Hewlett-Packard Laboratories, 1501 Page Mill Road, Palo Alto, CA 94303.
Karol et al.; *Prevention of Deadlocks and Livelocks in Lossless, Backpressured Packet Networks*; Lucent Technologies.

* cited by examiner

*Primary Examiner*—Ajit Patel
(74) *Attorney, Agent, or Firm*—Beyer Weaver LLP (57) ABSTRACT

Methods and apparatus are provided for alleviating deadlock and controlling congestion in a network such as a fibre channel network. Techniques are provided for detecting stalled frames at a fibre channel switch. Reserve credits are released when stalled frames are detected. In some instances, reserve credits are released after a predetermined period of time. Reserve credits allow transmission to effectively reduce deadlock and congestion. Reserve credits are particularly effective in reducing deadlock resulting from transient loops in a fibre channel network.

37 Claims, 8 Drawing Sheets

| Transmission Credits 501 |
|---|
| Priority Transmission Credits 503 |
| Reserve Transmission Credits 505 |

METHODS AND APPARATUS FOR ALLEVIATING DEADLOCK IN A FIBRE CHANNEL NETWORK

BACKGROUND OF THE INVENTION

1. Field of the Invention

The present invention relates to network congestion control. More specifically, the present invention relates to methods and apparatus for detecting and alleviating conditions such as deadlock.

2. Description of Related Art

Many conventional network protocols use packet dropping to alleviate congestion at a network node. In one example, a network node in an IP based network receives input data from multiple sources at a rate exceeding its output bandwidth. In conventional implementations, selected packets are dropped to allow transmission of remaining packets within the allocated output bandwidth. Packets can be dropped randomly or dropped using various selection criteria. The dropped packets are ultimately retransmitted under the control of a higher level protocol such as TCP.

In networks such as fibre channel networks, packet dropping is generally highly undesirable. Instead, networks such as fibre channel networks implement end-to-end and buffer-to-buffer flow control mechanisms. End-to-end and buffer-to-buffer flow control mechanisms do not allow a first network node to transmit to a second network node until a second network node is ready to receive a frame. The second network node typically indicates that it is ready to receive a frame by granting credits to the first network node. When frames are transmitted, credits are used. When no credits remain, the first network node can no longer transmit to the second network node. However, end-to-end and buffer-to-buffer flow control mechanisms provide only a very rough technique for controlling congestion, as the mechanism blocks all traffic along a particular link.

Such blocking can lead to deadlock, a situation where two or more switches are unable to transmit because the switches are no longer able to receive additional frames. For example, a first switch cannot transmit to a second switch because the second switch has a full buffer. However, buffer space cannot be freed until the second switch can transmit to the first switch that also has a full buffer. Blocking can also quickly propagate upstream to other links in a fibre channel network topology. Some of these links might serve as corridors for paths that do not include the originally congested link. Hence, congestion at one link of one network path can sometimes cause blocking over a much wider portion of a fibre channel topology.

It is therefore desirable to provide methods and apparatus for improving congestion control at networks nodes in a network such as a fibre channel network with respect to some or all of the performance limitations noted above.

SUMMARY OF THE INVENTION

Methods and apparatus are provided for alleviating deadlock and controlling congestion in a network such as a fibre channel network. Techniques are provided for detecting stalled frames at a fibre channel switch. Reserve credits are released when stalled frames are detected. In some instances, reserve credits are released after a predetermined period of time. Reserve credits allow transmission to effectively reduce deadlock and congestion. Reserve credits are particularly effective in reducing deadlock resulting from transient loops in a fibre channel network.

In one embodiment, a method for controlling congestion in a fibre channel network is provided. It is determined a plurality of frames buffered at a first switch in a fibre channel network are stalled. The first switch is configured to buffer the plurality of frames until a second switch provides a second switch transmission credit to the first switch. A reserve credit is provided to the first switch. The reserve credit allows transmission of one of the plurality of frames to the second switch. The transmission of one of the plurality of frames allows the first switch to release a transmission credit to the second switch.

In another embodiment, a fibre channel switch in a fibre channel network is provided. The switch includes a buffer and a processor. A buffer is configured to hold a first plurality of frames until transmission credits are available to send the first plurality of frames. The processor is configured to obtain a reserve credit. The reserve credit allows transmission of one of the plurality of frames to a second switch. Transmission of one of the plurality of frames allows the first switch to release a transmission credit to the second switch.

Other mechanisms for reducing congestion and deadlock include fibre channel congestion control and priority credit reservation. Fibre channel congestion control is described in U.S. patent application Ser. No. 10/026,583, titled Methods And Apparatus For Network Congestion Control filed on Dec. 18, 2001, the entirety of which is incorporated by reference for all purposes. Priority credit reservation is described in U.S. patent application Ser. No. 10/205,668, titled Methods And Apparatus For Credit Based Flow Control filed on Jul. 25, 2002, the entirety of which is incorporated by reference for all purposes.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention are particularly effective in alleviating deadlock resulting from transient loops in a fibre channel network. However, the techniques of the present invention can be applied to not only deadlock resulting from transient loops, but deadlock and congestion in general. Furthermore, the techniques of the present invention will be described in the context of fibre channel used in a storage area network. However, it should be noted that the techniques of the present invention can be applied to a variety of different protocols and networks. Further, the solutions afforded by the invention are equally applicable to non-fibre channel networks. In one example, the techniques can apply to networks that generally do not allow packet dropping, although the techniques of the present invention can apply to a variety of different networks including IP networks. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Methods and apparatus are provided for alleviating congestion at a network node. The congestion can lead to data transmission delays or data transmission loss. Consequently, techniques are provided for detecting deadlock and congestion at a network node and alleviating deadlock and congestion using resource credits.

Figure 1:
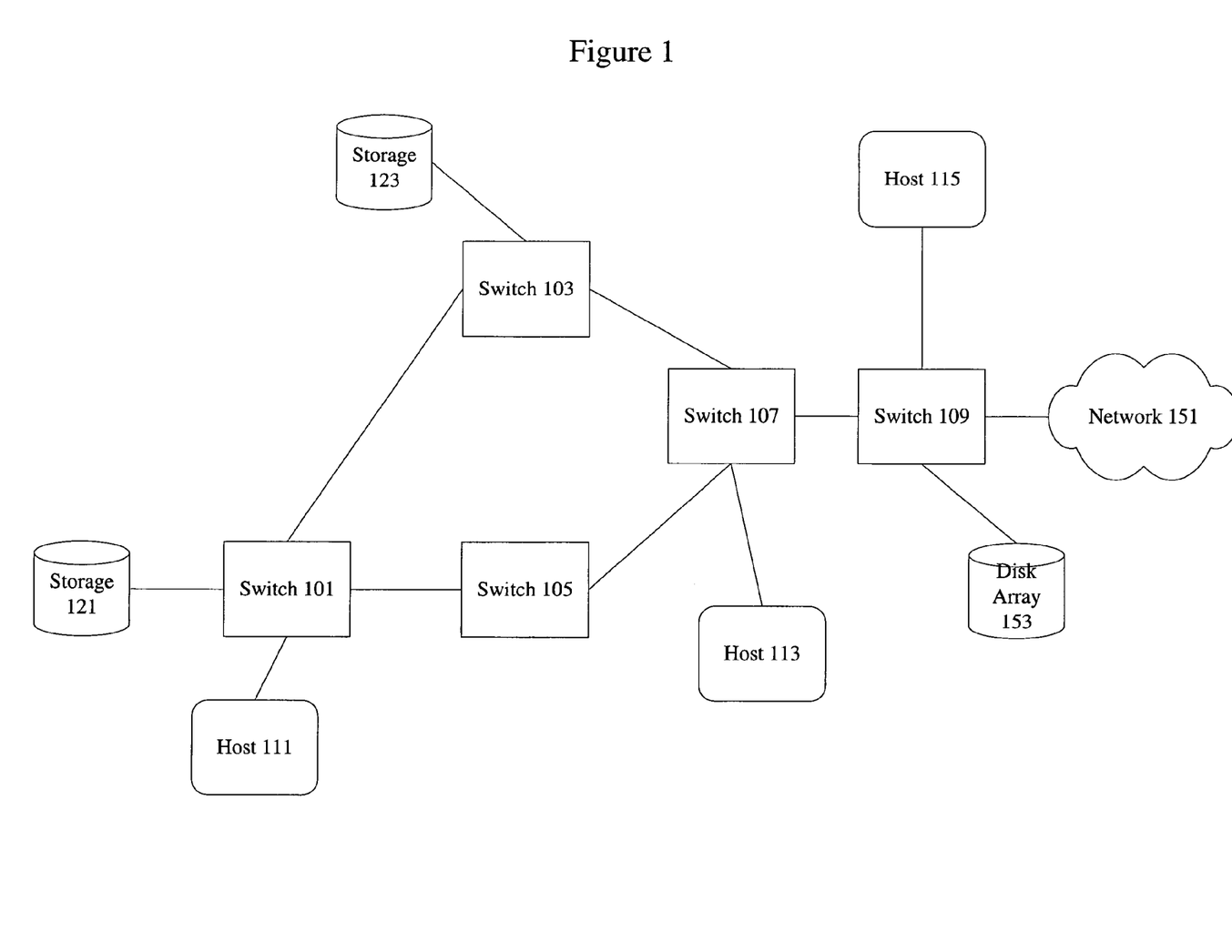
FIG. 1 is a diagrammatic representation a network that can use the techniques of the present invention.
Figure 2:
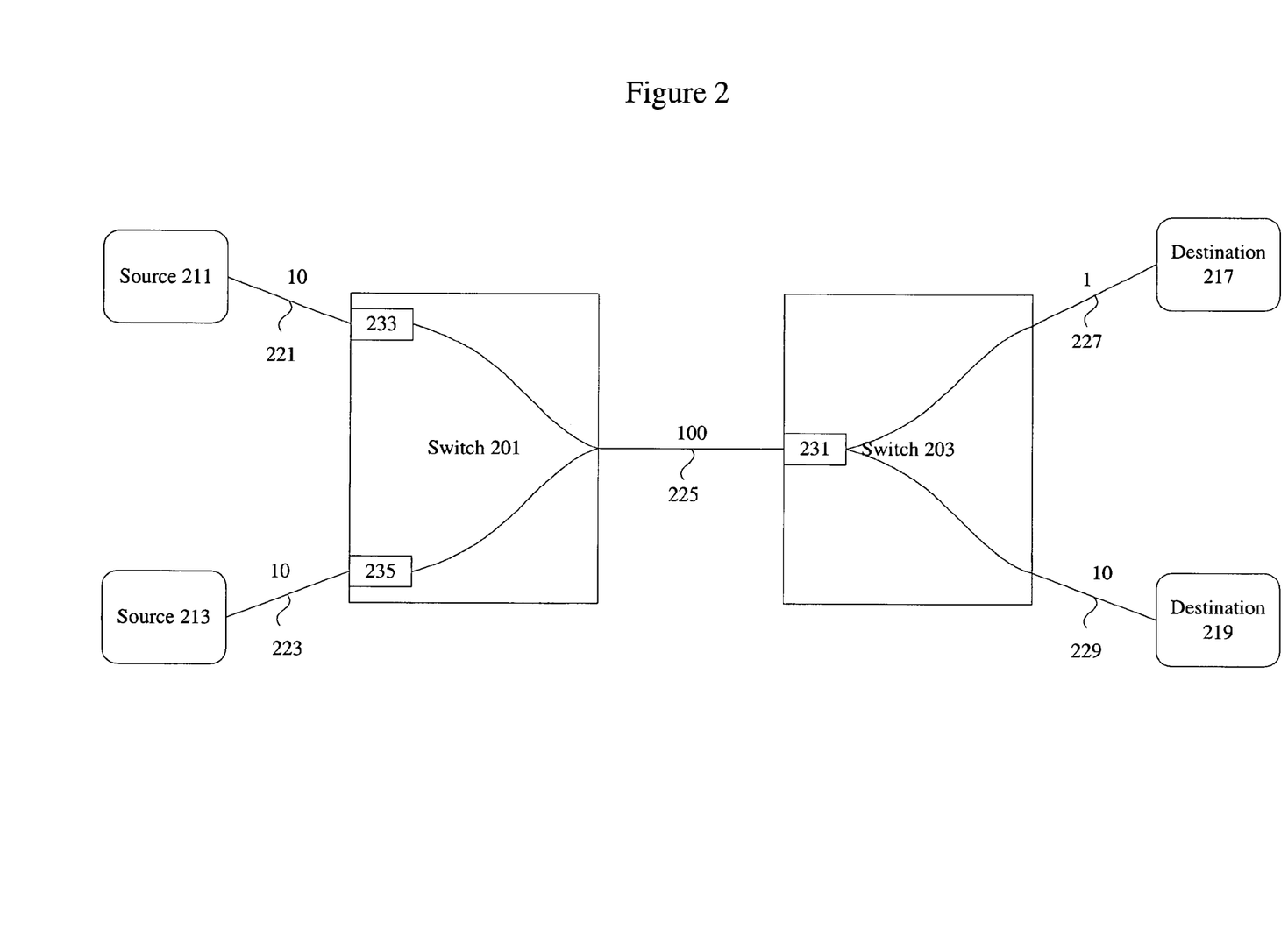
FIG. 2 is a diagrammatic representation showing a credit based transmission mechanism.
Figure 3:
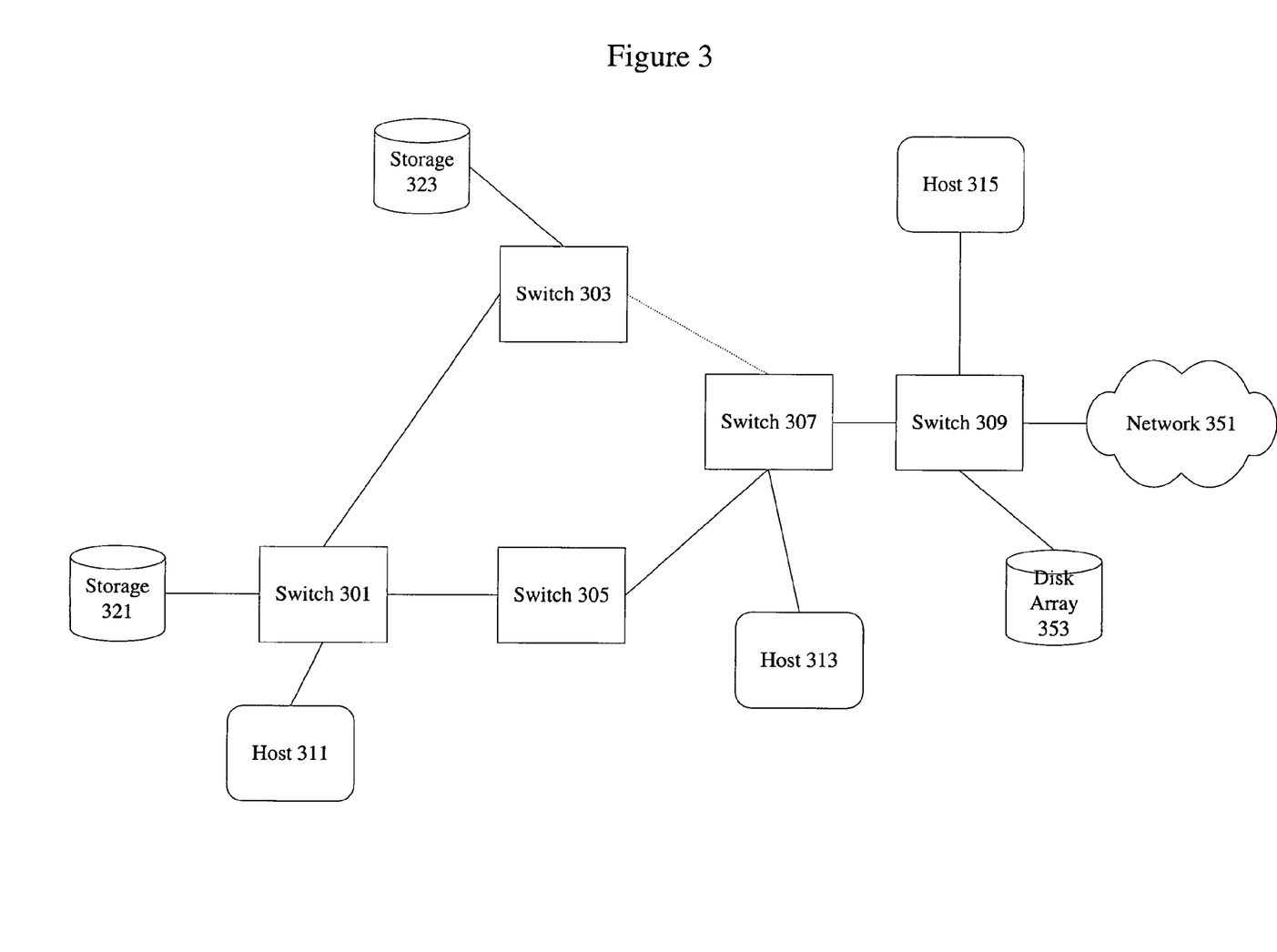
FIG. 3 is a diagrammatic representation showing a network condition that may cause deadlock.
Figure 4:
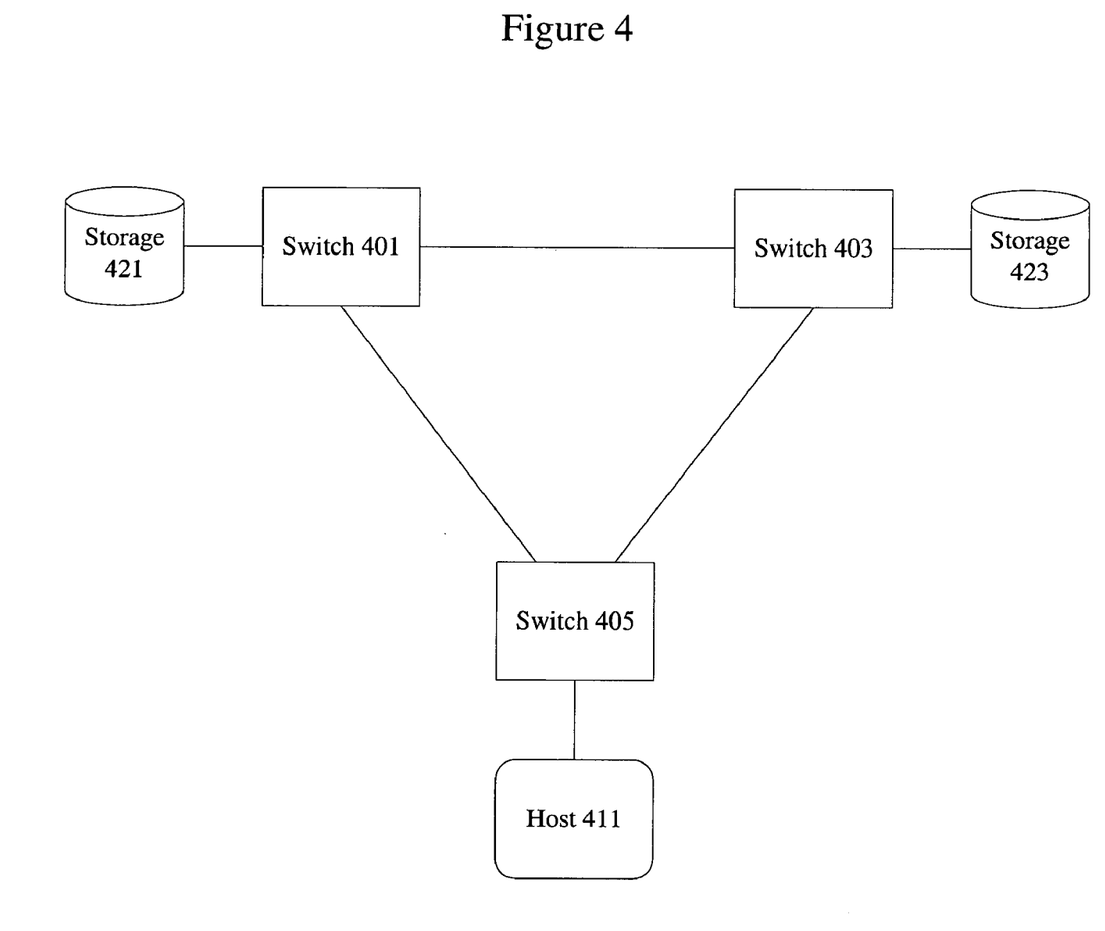
FIG. 4 is a diagrammatic representation showing a network topology prone to deadlock.

FIGS. 1-4 show various types of congestion that can be alleviated using the techniques of the present invention. FIGS. 1-2 show cascading congestion and head of line blocking while FIGS. 3-4 show various deadlock conditions in a fibre channel network. FIG. 1 is a diagrammatic representation of a network showing general congestion that may result in a fibre channel network. Although the techniques of the present invention will be discussed in the context of fibre channel in a storage area network, it should be noted as indicated above that the techniques of the present invention can be applied to a variety of contexts including various local and wide area networks. Various techniques can be applied in any network where a single network node can act as a point of congestion for multiple flows or paths.

FIG. 1 shows a storage area network implemented using fibre channel. A switch 101 is coupled to switches 103 and 105 as well as to a host 111 and storage 121. In one embodiment, host 111 may be a server or client system while storage 121 may be single disk or a redundant array of independent disks (RAID). Switches 103 and 105 are both coupled to switch 107. Switch 107 is connected to host 113 and switch 103 is connected to storage 123. Switch 109 is connected to host 115, switch 107, disk array 153, and an external network 151 that may or may not use fibre channel. In order for a host 111 to access network 151, several paths may be used. One path goes through switch 103 while another path goes through switch 105. A variety of mechanisms may cause congestion and/or deadlock in a network 151.

As noted above, when a switch or router in a conventional IP network is congested, packets are dropped. Packets may be dropped randomly or selectively dropped with some degree of intelligence. By dropping packets, flows that were consuming a large amount of bandwidth will generally have more packets dropped than flows that were consuming a smaller amount of bandwidth. Although flow rates through the congested switch or router will be reduced with the dropping of packets, packets will get through the switch 109 to network 151. Congestion at switches 103 and 105 is not introduced because of congestion at switch 107 or switch 109.

Fibre channel, however, does not allow the dropping of packets. Instead, when a switch 109 is congested because of various reasons such as the failure or inability of a network 151 to receive more frames, a buffer-to-buffer credit mechanism is used to control traffic flow from switch 107 to switch 109. In typical implementations, a network node such as a switch 109 allocates a predetermined number of credits to switch 107. Every time the switch 107 transmits frames to switch 109, credits are used. A switch 109 can then allocate additional credits to switch 107 when the switch 109 has available buffers. When a switch 107 runs out of credits, it can no longer transmit to switch 109. Because of the failure or inability of a network 151 to receive more frames, switch 109 and consequently switch 107 can not transmit to network 151. It should be noted that although network 151 is described as a point of congestion in one embodiment, in other embodiments, a disk array 153, a component within a switch, or a host 115 may be a source of congestion.

A buffer-to-buffer credit mechanism is a very rough way of reducing traffic flow to a switch 109. The credit mechanism not only prevents traffic from traveling from switch 107 to switch 109 and subsequently to network 151, but it also prevents traffic from flowing from switch 107 to switch 109 to host 115 even though host 115 and its associated link may have the bandwidth to receive additional frames from switch 109. The buffer-to-buffer credit mechanism can result in the blocking of traffic traveling to an uncongested destination such as host 115. In one example, a host 111 may be communicating with a congested network 151. Because of the congestion in network 151, switch 109 queues a large number of frames from host 111 and consequently uses the buffer-to-buffer credit mechanism to prevent switch 107 from transmitting any more frames whether the frames are from a host 111 or a host 113.

A host 113, on the other hand, may be merely attempting to transmit a few frames to a host 115. Because network congestion causes switch 109 to implement the buffer-to-buffer credit mechanism between switch 107 and switch 109, few frames can travel from host 113 to host 115 through the link connecting switch 107 and switch 109 even though the true point of congestion is the network 151. Frames can only be transmitted slowly to host 115 or to network 151 because of congestion in the network 151 or disk array 153.

It should be noted that frames are generally layer two constructs that include the layer three packet constructs. Frames and packets will generally be used interchangeably herein to describe network transmissions. It should also be noted that although the point of congested here is the network 151, other contemplated points of congestion can be a host 115 or a disk array 153 connected to a switch 109.

Because switch 107 can only transmit slowly to switch 109, switch 107 may have to implement the same buffer-to-buffer credit mechanism with switches 103 and 105. When switches 103 and 105 can only transmit slowly to switch 107, switches 103 and 105 may have to implement a buffer-to-buffer credit mechanism with switch 101. Congestion consequently can cascade throughout the network. The cascading congestion phenomenon can be referred to as congestion spreading. The techniques of the present invention provide mechanisms for alleviating deadlock and congestion in a network.

FIG. 2 is diagrammatic representation of a simplified network depicting head-of-line blocking. In FIG. 2, source node 211 is transmitting data to destination node 217 through switches 201 and 203. Source node 213 is transmitting data to destination node 219 through switches 201 and 203. It should be noted that source nodes 211 and 213 as well as destination nodes 217 and 219 can be entities such as switches, hosts, external networks, or disks. In one example, links 221, 223, and 229 each allow transmission at 10 bytes per second. Link 225 allows transmission at 100 bytes per second. Link 227, however, only allows transmission at one byte per second. If both source node 211 and source node 213 are transmitting to respective destinations 217 and 219 at 10 bytes per second, congestion will result at switch 203 because link 227 can only transmit at one byte per second. Packets or frames from source node 211 will accumulate at switch 203 because switch 203 can not transmit at a sufficient rate to destination 217. Switch 203 has a shared memory 231 associated with link 225. Switch 201 has shared memory 233 and shared memory 235 associated with links 221 and 223 respectively. More detail on shared memory and congestion characteristics of each switch will be provided with reference to FIG. 3 below.

In shared memory implementations, switch 203 has a shared memory 231 for all traffic arising from link 225. This shared memory 231 can contain packets and frames destined for either destination node 217 or destination node 219. If packets or frames destined for destination node 217 fill the shared memory associated with switch 203, frames destined for either destination node 217 or destination node 219 can be accepted at switch 203 at a much lower rate. A switch 203 can then block additional incoming traffic by using the buffer-to-buffer credit mechanism. The buffer-to-buffer credit mechanism slows traffic flowing not only along congested path from source 211 to destination 217 but also traffic along originally noncongested path from source 213 to destination 219. As a result of the slowed traffic, even though the bandwidth on link 225 is more than adequate to transfer traffic between node 213 and node 219, node 213 will be able to transfer only 1 byte second to node 219.

A variety of techniques are used to alleviate the effects of congestion at a network node. Some techniques are described in U.S. patent application Ser. No. 10/026,583, titled Methods And Apparatus For Network Congestion Control filed on Dec. 18, 2001, the entirety of which is incorporated by reference for all purposes. The techniques of the present invention provide techniques that are particularly effective in alleviating the effects of deadlock.

FIG. 3 is a diagrammatic representation showing deadlock resulting from a transient loop. Deadlock can result from several causes. In one example, temporary deadlock may result in a transient loop created during routing table convergence. In another example, persistent deadlock may result from non-optimal network topologies, such as a topology having a ring of switches. A switch 301 is coupled to switches 303 and 305 as well as to a host 311 and storage 321. In one embodiment, host 311 may be a server or client system while storage 321 may be single disk or a redundant array of independent disks (RAID). Switches 303 and 305 are both coupled to switch 307. Switch 307 is connected to host 313 and switch 303 is connected to storage 323. Switch 309 is connected to host 315, switch 307, disk array 353, and an external network 351 that may or may not use fibre channel. In order for a host 311 to access network 351, several paths may be used. One path goes through switch 303 while another path goes through switch 305.

According to various embodiments, frames initially flow from switch 301 to switch 307 through switch 303. At some point, the link between switch 303 and switch 307 fails. Switches in the network detect the failure of the link between switch 303 and switch 307. When the failure of the link is detected, various link state messages are transmitted between switches to allow the generation of new routing tables. Each switch uses link state information to create new routing tables used for determining how frames are forwarded. In one example, a switch 303 has a routing table indicating that frames with a destination of host 313 should be forwarded to switch 307. However, after link state information is exchanged, a new routing table is generated at switch 303 to indicate that frames with a destination of host 313 should be forwarded to switch 301. The frames can then be routing through an alternate path traveling through switch 303. However, in some instances, a new routing table may be generated at switch 303 before that routing table at switch 301 is updated.

Consequently, data frames at switch 301 destined for a host 313 would be looped between switch 301 and switch 303. The temporary or transient loop resulting from inconsistent routing tables may cause buffers in switches 301 and 303 to fill. Credits for transmission between switches 301 and 303 may eventually be exhausted due to continuous transmission of the same frames between the two switches. According to various embodiments, priority credits are provided for the transmission of link state related frames. Link state related frames can be transmitted even when regular credits have been exhausted to allow the generation of new routing tables. However, regular frames in the buffers of the two switches are stalled because no regular credits are available. A frame delayed in a buffer for a particular period of time is referred to herein as a stalled frame. Even after the new routing tables are generated in both switches and the transient loop is removed, frames still can not be transmitted because of the lack of credits.

According to the techniques of the present invention, when deadlock or congestion is detected, one or more reserve credits are released. The reserve credits allow transmission of frames from a first switch to free buffer space in a first switch. Because buffer space is now available, a credit can be provided to a second switch. Providing a single reserve credit can significantly the probability of relying on frame drops to relieve deadlock. In one instance, deadlock or congestion is detected after frames are stalled for a particular period of time. In another instance, reserve credits are released after new routing tables are generated. Since new routing tables have been generated and the routing tables have converged, the transient loops no longer remain. Frames will no longer be sent between switches 303 and 305 and instead would be forwarded from switch 303 to switch 301.

In many instances, between 1 and 5 percent of all available credits are designated reserve credits. Reserve credits may be release periodically after deadlock or congestion is detected. In one example, reserve credits are released after new routing tables are generated.

FIG. 4 is a diagrammatic representation showing another example of deadlock. In FIG. 3, deadlock occurs between of a transient loop between two switches. FIG. 4 shows deadlock resulting in an interaction between three switches. Deadlock occurs relatively frequently in fibre channel networks. Deadlock sometimes arises because of transient loops resulting from the generation of new routing tables.

However, in another example, deadlock can also occur due to topology. As noted above, deadlock is a condition under which the throughput of at least a portion of a fibre channel network goes to zero. In other words, frames in at least a portion of the network are stalled. According to various embodiments, a fibre channel switch 401 is connected to fibre channel switch 403 and fibre channel switch 405. Switch 401 is also connected to storage node 421. Switch 403 is connected to switches 405 and 401 as well as to storage node 423. Switch 405 is connected to switches 401 and 403 as well as to host 411. In one example, deadlock can occur if switch 401 has a buffer full of frames destined for storage node 413, switch 403 has a buffer full of frames destined for host 411, and switch 405 has a buffer full of frames destined for storage node 421. Switch 401 can not provide any credits to switch 405, switch 403 can not provide any credits to switch 401, and switch 405 can not provide any credits to switch 403.

As noted above, when a switch or router in a conventional IP network is congested, packets are dropped. Packets may be dropped randomly or selectively dropped with some degree of intelligence. By dropping packets, flows that were consuming a large amount of bandwidth will generally have more packets dropped than flows that were consuming a smaller amount of bandwidth. Although flow rates through the congested switch or router will be reduced with the dropping of packets, packets will get through the various switches to their destinations. Deadlock is not introduced because packet dropping is allowed. In fibre channel networks, however, fibre dropping is highly undesirable, and in many instances is used only as a last resort.

Typically when deadlock occurs in fibre channel networks, link activity is monitored. In one example, if frames are stalled for longer than a frame drop timeout period or a frame drop interval at a switch 401, the frames in the buffer of switch 401 are dropped. After the frames are dropped, credits can then be provided to other switches. Because credits are provided, other switches are then able to transmit frames and the deadlock condition is alleviated. However, dropping frames can cause a variety of deleterious effects and consequently, it is desirable to avoid frame dropping as much as possible. According to various embodiments, edge quench are path quench messages are used to reduce traffic flow from source nodes when congestion is detected in early stages. Some fibre channel congestion control effective for alleviating congestion and limiting deadlock mechanisms are described in U.S. patent application Ser. No. 10/026,583, titled Methods And Apparatus For Network Congestion Control filed on Dec. 18, 2001, the entirety of which is incorporated by reference for all purposes.

However, fibre channel congestion control mechanisms are not always completely effective in eliminating the occurrence of deadlock. For example, link changes and non-optimal topologies may still lead deadlock. According to various embodiments, the techniques of the present invention provide fibre channel switches with reserve credits. Reserve credits are released after a particular period of time. In one embodiment, reserve credits are released after a reserve credit interval or reserve credit timeout period. The period of time after deadlock is detected when reserve credits are released is referred to herein as a reserve credit interval or reserve credit timeout period. In some examples, the reserve credit interval is a fraction of the frame drop interval. In one instance, the reserve credit interval is one fifth of the frame drop interval of 500 ms. In other examples, the reserve credit interval is calculated based on the expected time needed for routing table convergence, or the period of time needed to eliminate inconsistencies or transient loops in routing tables.

The techniques of the present invention recognize that releasing even a single reserve credit can often times eliminate deadlock. Releasing a single credit after routing tables have converged can often times allow packets to be sent along the appropriate links instead of along these transient loops. The techniques of the present invention allow the release of one or more reserve credits at various times before the frame drop time period expires. For example, a reserve credit can be released at 100 ms, 200 ms, 300 ms, and 400 ms periods after traffic is stalled. At 500 ms, if traffic or frames remain stalled, frames are dropped. However, in many instances, releasing reserve credits eliminates the need to drop frames.

According to various embodiments, progressively more reserve credits are released at each interval. In another example exponentially more reserve credits are released at each interval. A single reserve credit may be released at 100 ms, two at 200 ms, four at 300 ms, and eight at 400 ms. In typical implementations, a network node such as a switch 403 allocates a predetermined number of credits to switch 401. Every time the switch 401 transmits frames to switch 403, credits are used. A switch 403 can then allocate additional credits to switch 401 when the switch 403 has available buffers. When a switch 401 runs out of credits, it can no longer transmit to switch 403. However, releasing reserve credits either at a switch 403 or at a switch 401 allows transmission of frames to alleviate deadlock.

Figure 5:
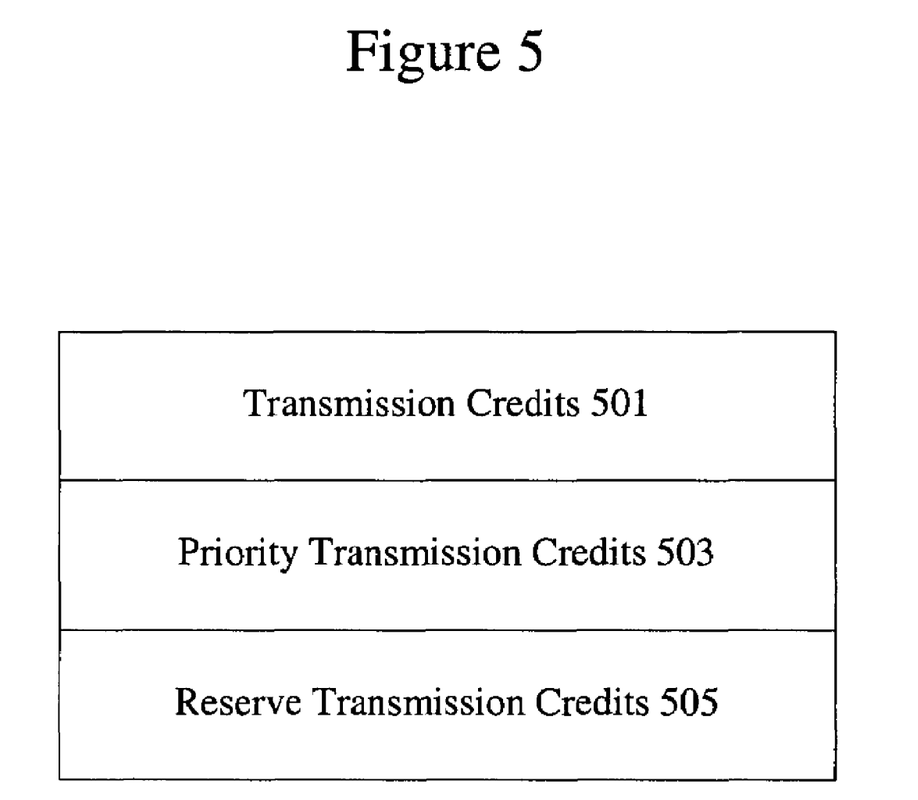
FIG. 5 is a diagrammatic representation showing types of credits.

FIG. 5 is a diagrammatic representation showing different types of credits that may be provided by a fibre channel switch. According to various embodiments, fibre channel switches have transmission credits 501. Transmission credits 501 allow the transmission of individual frames between fibre channel switches. In one example, when transmission credits are not available, frames can no longer be transmitted. There may be a one-to-one correspondence between credits and frames. However, in some cases, a single credit may allow the transmission of multiple frames. According to various embodiments, priority credits may also be available for transmission of special priority traffic. In one instance, priority credits 503 allow for the transmission of frames having higher priority.

Priority credits are often used to allow the exchange of link state frames that switches used to generate new routing tables. Network management frames may be designated as priority frames. In many instances, network management frames may be transmitted if either transmission credits 501 are available or priority transmission credits 503 are available. The techniques of the present invention also provide reserve transmission credits 505. Reserve transmission credits may be taken from the pool of available transmission credits. For example, if a switch is allocated 100 transmission credits, two of the 100 transmission credits may be designated as reserve credits.

The reserve credits can be used when a deadlock condition is detected. In one instance, the switch monitors a link for stalled frames. When all the frames in a particular buffer have been stalled for a designated period of time, a reserve credit may be released to allow transmission of a frame. When frames a transmitted, buffer space and credits are released to further relieve congestion. In another example, the generation of new routing tables is connected and reserve credits are released after it is believed that routing tables have converged, that is, routing tables now project a consistent topology. Various other types of credits may also be provided. In one example, credits of different priorities are provided to allow transmission of different classes of traffic. In another example, reserve credits may be separate from the pool available transmission credits. In still other examples, reserve priority credits may be provided. Reserve priority credits or priority credits may also be released for usage by low priority traffic when traffic stalls are detected.

Figure 6:
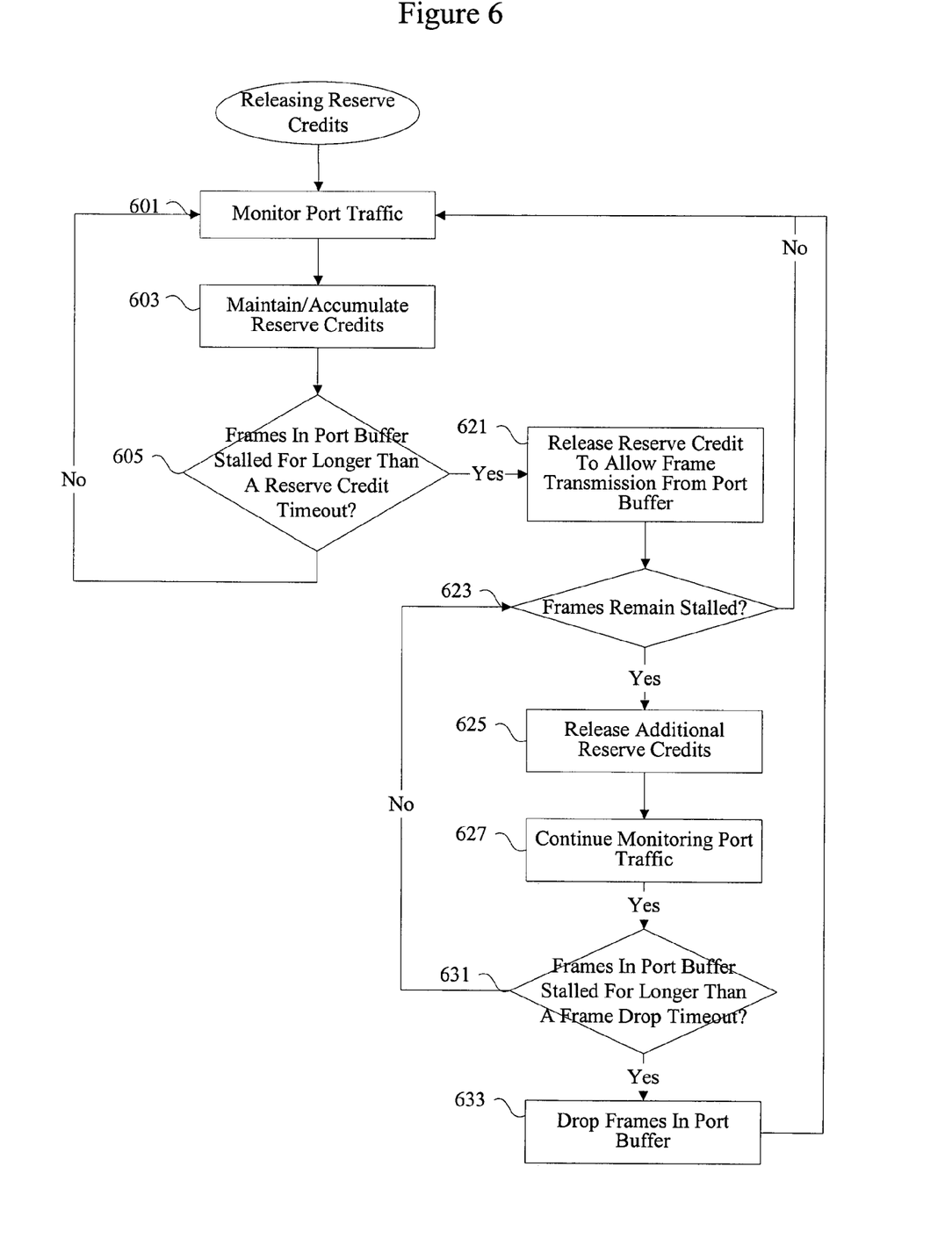
FIG. 6 is a flow process diagram showing a mechanism for releasing reserve credits.

FIG. 6 is a flow process diagram showing one technique for releasing reserve credits. At 601, port traffic is monitored. Monitoring port traffic may entail detecting the transmission of frames on a particular link. At 603, reserve credits are maintained and accumulated. In one example, a switch may run out of reserve credits after network congestion is detected for a period of time. Consequently, the switch may have to accumulate reserve credits after a deadlock condition is alleviated. At 605, it is determined if frames in a port buffer have been stalled for longer than a reserve credits timeout. If frames have been stalled for longer than a reserve credits timeout, one or more reserve credits are released at 621 to allow frame transmission from the port buffer. If frames in the port buffer have not been stalled for longer than a reserve credits timeout, the switch continues to monitor port traffic.

At 625, additional reserve credits can be released if frames remain stalled at 623. In one example, additional reserve credits are released after subsequent reserve credit timeouts expire. Otherwise, the flow returns to monitoring traffic at 601. At 627, the switch continues to monitor port traffic. At 631, if frames in the port buffer have been stalled for longer than a frame drop timeout, the frames are dropped. Otherwise, port traffic continues to be monitored and additional reserve credits are released if frames still remain stalled. It should be noted that typically, dropping frames is highly undesirable and consequently the frame drop timeout is several times larger than the reserve credit timeout.

Figure 7:
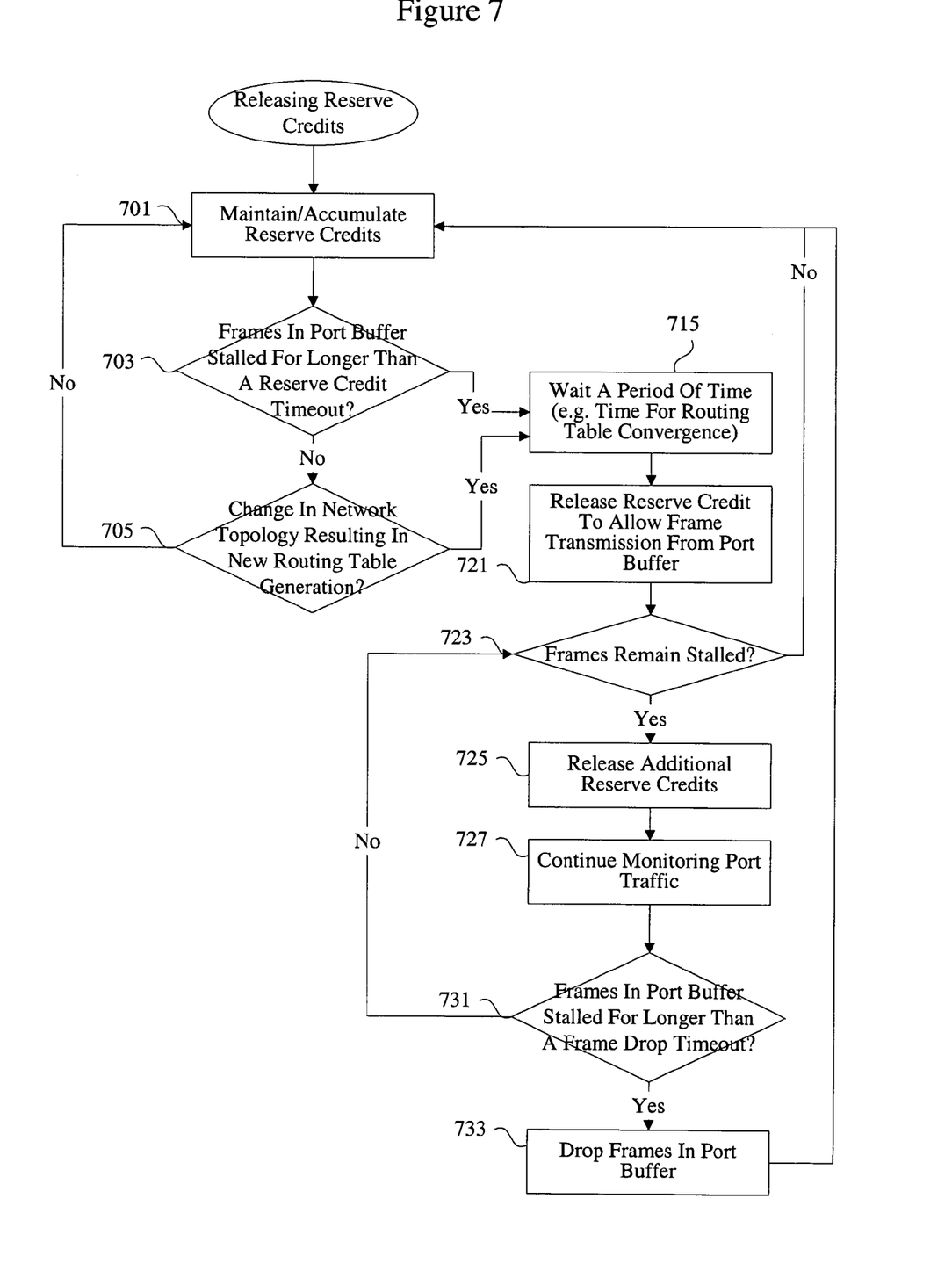
FIG. 7 is a flow process diagram showing another mechanism for releasing reserve credits.

FIG. 7 is a flow process diagram showing another technique for releasing reserve credits. At 701, reserve credits are maintained and accumulated as traffic is monitored. At 703, it is determined that frames in a port buffer have been stalled for longer than a reserve credit timeout. If the frames in the port buffer have been stalled for longer than a reserve credit timeout, the reserve credit is not necessarily have to be released. Instead, the switch waits a period of time before reserve credits are released at 721. Waiting a period of time allows routing tables in the fibre channel network to converge. In one example, the switch may wait a period of time equal to the estimated time needed for routing table convergence.

According to various embodiments, reserve credits do not necessarily have to brew released only after stalled traffic is detected. In one embodiment, changes in network topology resulting in the routing table generation are detected at 705. Generating new routing tables often leads to transient loops that may result in deadlock. If a change in network topology is detected at 705, reserve credits may only be released at 721 after a period of time. At 725, additional reserve credits are released if frames remain stalled at 723. If frames are no longer stalled, the flow returns to 701 and credits are maintained and accumulated. At 727, the switch continues to monitor port traffic. At 731, if frames in the port buffer remain stalled for longer than a frame drop timeout, frames are dropped. However, if the frame drop timeout has not elapsed, monitoring of port traffic continues and additional reserve credits are released if frames remain stalled.

As described above, techniques for alleviating deadlock may be performed in a variety of network devices or switches. According to various embodiments, a switch includes a processor, network interfaces, and memory. A variety of ports, Media Access Control (MAC) blocks, and buffers can also be provided as will be appreciated by one of skill in the art.

Figure 8:
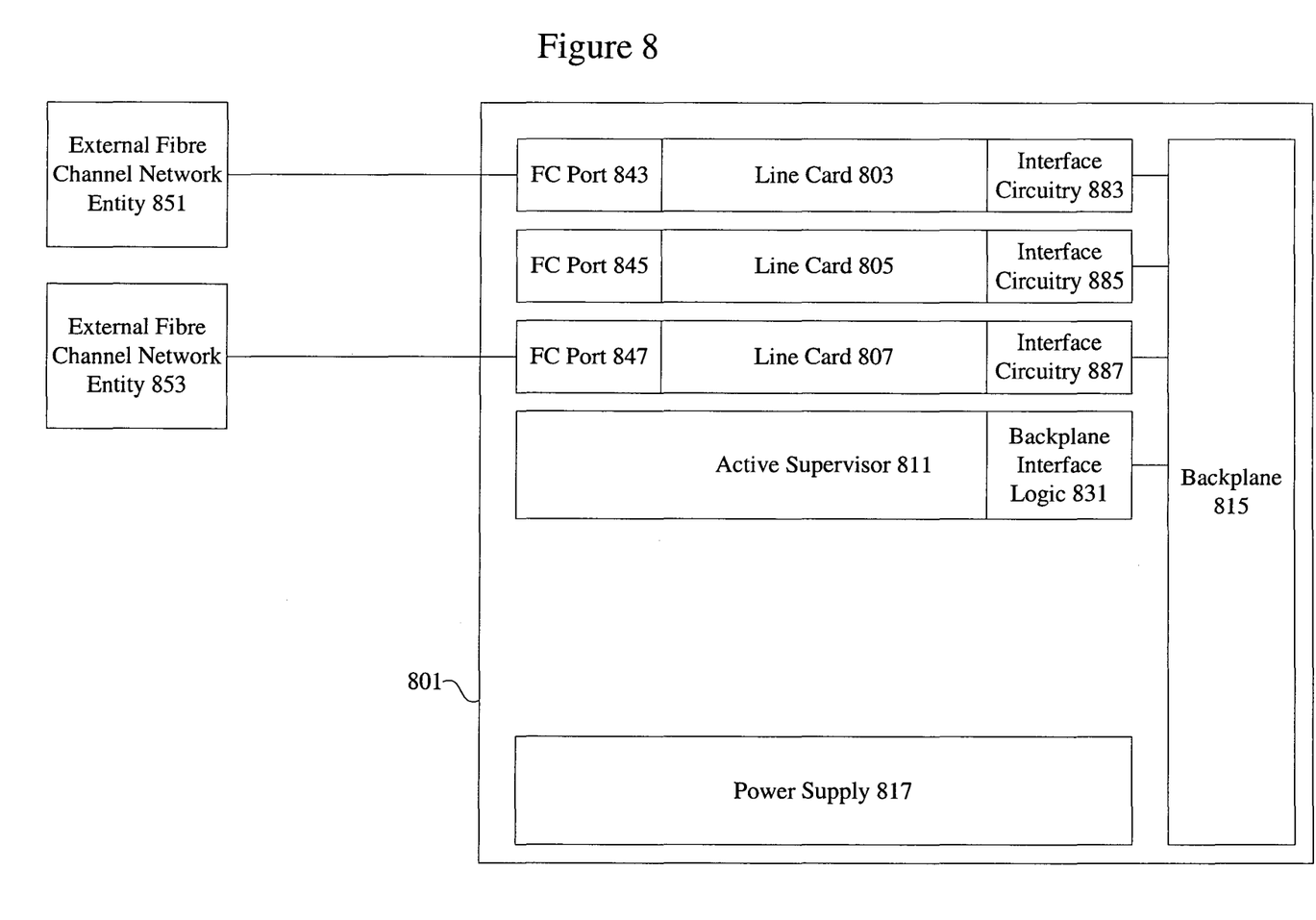
FIG. 8 is a diagrammatic representation of a fibre channel switch.

FIG. 8 is a diagrammatic representation of one example of a fibre channel switch that can be used to implement techniques of the present invention. Although one particular configuration will be described, it should be noted that a wide variety of switch and router configurations are available. The fibre channel switch 801 may include one or more supervisors 811. According to various embodiments, the supervisor 811 has its own processor, memory, and storage resources.

Line cards 803, 805, and 807 can communicate with an active supervisor 811 through interface circuitry 883, 885, and 887 and the backplane 815. According to various embodiments, each line card includes a plurality of ports that can act as either input ports or output ports for communication with external fibre channel network entities 851 and 853. The backplane 815 can provide a communications channel for all traffic between line cards and supervisors. Individual line cards 803 and 807 can also be coupled to external fibre channel network entities 851 and 853 through fibre channel ports 843 and 847.

External fibre channel network entities 851 and 853 can be nodes such as other fibre channel switches, disks, RAIDS, tape libraries, or servers. It should be noted that the switch can support any number of line cards and supervisors. In the embodiment shown, only a single supervisor is connected to the backplane 815 and the single supervisor communicates with many different line cards. The active supervisor 811 may be configured or designed to run a plurality of applications such as routing, domain manager, system manager, and utility applications.

According to one embodiment, the routing application is configured to provide credits to a sender upon recognizing that a frame has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method for controlling congestion in a fibre channel network, the method comprising:
   determining that a plurality of frames buffered at a first switch in a fibre channel network are stalled, wherein the first switch is configured to buffer the plurality of frames until a second switch provides a second switch transmission credit to the first switch; and
   providing a reserve credit to the first switch, the reserve credit allowing transmission of one of the plurality of frames to the second switch, wherein transmission of one of the plurality of frames allows the first switch to release a transmission credit to the second switch.

2. The method of claim 1, wherein the transmission credit is provided to the second switch, allowing the second switch to transmit a frame to the first switch, thereby releasing a loop lock-out.

3. The method of claim 2, wherein loop lock-out results from a temporary routing loop in the fibre channel network.

4. The method of claim 3, wherein loop tock-out results from a topology change triggering a temporary routing loop in the fibre channel network.

5. The method of claim 1, wherein the first switch transmission credit is provided to a third switch, allowing the third switch to transmit a frame to the first switch, thereby releasing a loop lock-out.

6. The method of claim 1, further comprising:
   providing a reserve credit to the second switch, the reserve credit allowing transmission transmission from the second switch to the first switch.

7. The method of claim 1, further comprising:
   prior to detecting that the first plurality of frames are stalled, reducing that rate of traffic flow to the first switch.

8. The method of claim 7, further comprising:
   wherein the rate of traffic flow to the first switch is reduced using edge quench and path quench packets.

9. The method of claim 1, wherein polling of a first switch link is used to determine that the plurality of frames are stalled.

10. The method of claim 9, wherein polling of a first switch link is performed after at routing tables have converged.

11. The method of claim 9, wherein polling is performed using reserve credit intervals.

12. The method of claim 11, further comprising determining that the frame buffered remains stalled despite the release of the reserve credit.

13. The method of claim 12, further comprising releasing an additional reserve credit at the first switch.

14. The method of claim 12, further comprising dropping the plurality of frames buffered at the first switch.

15. The method of claim 11, wherein polling of the first switch link is performed to determine that the plurality of frames remain stalled.

16. The method of claim 15, wherein polling to determine that the plurality of frames remain stalled is performed using frame drop intervals.

17. The method of claim 1, Her comprising placing a credit back into reserve at the first fibre channel switch when it is determined that the plurality of frames are no longer stalled.

18. A fibre channel switch in a fibre channel network, the switch comprising:
   a buffer at a first fibre channel switch in a fibre channel network, the buffer configured to hold a first plurality of frames until transmission credits are available to send the first plurality of frames;
   a processor configured to obtain a reserve credit, the reserve credit allowing transmission of one of the plurality of frames to a second switch, wherein transmission of one of the plurality of frames allows the first fibre channel switch to release a transmission credit to the second switch.

19. The fibre channel switch of claim 18, wherein the transmission credit is provided to the second switch, allowing the second switch to transmit a frame to the first switch, thereby releasing a loop lock-out.

20. The fibre channel switch of claim 19, wherein loop lock-out results from a temporary routing loop in the fibre channel network.

21. The fibre channel switch of claim 20, wherein loop lock-out results from a topology change triggering a temporary routing loop in the fibre channel network.

22. The fibre channel switch of claim 18, wherein the first switch transmission credit is provided to a third switch, allowing the third switch to transmit a frame to the first switch, thereby releasing a loop lock-out.

23. The fibre channel switch of claim 18, further comprising:
   providing a reserve credit to the second switch, the reserve credit allowing transmission transmission from the second switch to the first switch.

24. The fibre channel switch of claim 18,
   wherein the rate of traffic flow to the first switch is reduced prior to detecting that the first plurality of frames are stalled.

25. The fibre channel switch of claim 24, further comprising:
   wherein the rate of traffic flow to the first switch is reduced using edge quench and path quench packets.

26. A fibre channel switch, comprising:
   means for determining that a plurality of frames buffered at a first switch in a fibre channel network are stalled, wherein the first switch is configured to buffer the plurality of frames until a second switch provides a second switch transmission credit to the first switch; and
   means for obtaining a reserve credit at the first switch, the reserve credit allowing transmission of one of the plurality of frames to the second switch, wherein transmission of one of the plurality of frames allows the first switch to release a transmission credit to the second switch.

27. The fibre channel switch of claim 26, wherein the transmission credit is provided to the second switch, allowing the second switch to transmit a frame to the first switch, thereby releasing a loop lock-out.

28. The fibre channel switch of claim 27, wherein loop lock-out results from a temporary routing loop in the fibre channel network.

29. The fibre channel switch of claim 28, wherein loop lockout results from a topology change triggering a temporary routing loop in the fibre channel network.

30. The fibre channel switch of claim 26, wherein the first switch transmission credit is provided to a third switch, allowing the third switch to transmit a frame to the first switch, thereby releasing a loop lock-out.

31. The fibre channel switch of claim 26, further comprising:
means for providing a reserve credit to the second switch, the reserve credit allowing transmission from the second switch to the first switch.

32. The fibre channel switch of claim 26, further comprising:
means for reducing that rate of traffic flow to the first switch prior to detecting that the first plurality of frames are stalled.

33. The fibre channel switch of claim 32, further comprising:
wherein the rate of traffic flow to the first switch is reduced using edge quench and path quench packets.

34. The fibre channel switch of claim 26, wherein polling of a first switch link is used to determine that the plurality of frames are stalled.

35. The fibre channel switch of claim 34, wherein polling of a first switch link is performed after at routing tables have converged.

36. A computer readable storage medium having computer code embodied therein, the computer readable storage medium comprising:
computer code for determining that a plurality of frames buffered at a first switch in a fibre channel network are stalled, wherein the first switch is configured to buffer the plurality of frames until a second switch provides a second switch transmission credit to the first switch; and
computer code for obtaining a reserve credit at the first switch, the reserve credit obtained from an interface included in the first switch, the reserve credit allowing transmission of one of the plurality of frames to the second switch, wherein transmission of one of the plurality of frames allows the first switch to release a transmission credit to the second switch.

37. The computer readable storage medium of claim 36, wherein the transmission credit is provided to the second switch, allowing the second switch to transmit a frame to the first switch, thereby releasing a loop lock-out.

* * * * *